US009972075B2

(12) United States Patent
Lin

(10) Patent No.: US 9,972,075 B2
(45) Date of Patent: May 15, 2018

(54) IMAGE CORRECTION METHOD OF PROJECTOR AND IMAGE CORRECTION SYSTEM

(71) Applicant: National Taiwan University of Science and Technology, Taipei (TW)

(72) Inventor: Tzung-Han Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days. days.

(21) Appl. No.: 15/294,350

(22) Filed: Oct. 14, 2016

(65) Prior Publication Data

US 2018/0061021 A1    Mar. 1, 2018

(30) Foreign Application Priority Data

Aug. 23, 2016  (TW) .............................. 105126843 A

(51) Int. Cl.
*G06T 5/00*    (2006.01)
*G06T 7/00*    (2017.01)
(Continued)

(52) U.S. Cl.
CPC ................ *G06T 5/006* (2013.01); *G06T 5/50* (2013.01); *G06T 7/0018* (2013.01); *H04N 9/3185* (2013.01); *G06T 2207/20216* (2013.01)

(58) Field of Classification Search
CPC . G06T 5/006; G06T 5/50; G06T 2207/20216; H04N 9/3185
See application file for complete search history.

(56) References Cited

U.S. PATENT DOCUMENTS 5,638,117 A * 6/1997 Engeldrum ............ H04N 17/02
                                                   345/904
5,870,069 A * 2/1999 Choh ........................ G01J 3/46
                                                    345/22

(Continued)

FOREIGN PATENT DOCUMENTS

CN        1484198       3/2004
TW        I273334       2/2007
(Continued)

OTHER PUBLICATIONS

"MiiCraft: world's smallest industrial SLAbased DLP 3D printer," Miicraft, Retrieved on Nov. 9, 2016, Available at: http://www.miicraft.com/.
(Continued)

*Primary Examiner* — Brian Yenke
(74) *Attorney, Agent, or Firm* — J.C. Patents

(57) ABSTRACT

An image correction method of projector and an image correction system are provided. An image capturing apparatus shoots a physical calibration panel to obtain a first image, and shoots an outputting image of a calibration panel pattern on a projection screen outputted from the projector to obtain a second image. A processor analyzes the first image to obtain a first calibration parameter and a first homography matrix, and performs an undistorting operation for the second image based on the first calibration parameter to obtain a third image. The processor analyzes the third image to obtain a second calibration parameter and a second homography matrix of the projector. The processor performs a compensating operation for an original image to be outputted from the projector based on the second calibration parameter, the second homography matrix and the first homography matrix to obtain a compensated image.

10 Claims, 4 Drawing Sheets

(51) Int. Cl.
*H04N 9/31* (2006.01)
*G06T 5/50* (2006.01)

(56) References Cited

U.S. PATENT DOCUMENTS

| | | | | |
|---|---|---|---|---|
| 6,061,102 A * | 5/2000 | Sheppard | H04N 5/20 | 348/191 |
| 6,452,627 B1 * | 9/2002 | Hamaguri | H04N 17/04 | 348/180 |
| 6,753,907 B1 * | 6/2004 | Sukthankar | H04N 5/7408 | 348/190 |
| 6,836,298 B2 * | 12/2004 | Song | H04N 3/2335 | 348/745 |
| 6,932,480 B2 * | 8/2005 | Wada | H04N 5/74 | 348/E5.137 |
| 7,419,268 B2 * | 9/2008 | Kobayashi | H04N 9/3182 | 348/745 |
| 7,600,875 B2 * | 10/2009 | Inoue | G03B 21/26 | 348/188 |
| 7,771,055 B2 | 8/2010 | Matsumoto et al. | | |
| 7,905,607 B2 | 3/2011 | Takatsu et al. | | |
| 8,142,029 B2 | 3/2012 | Matsumoto et al. | | |
| 8,295,588 B2 * | 10/2012 | Fujieda | G06T 7/85 | 382/118 |
| 8,373,859 B2 * | 2/2013 | Chhibber | A61B 5/0059 | 356/364 |
| 8,425,047 B2 | 4/2013 | Matsumoto et al. | | |
| 8,698,901 B2 * | 4/2014 | Hong | H04N 7/144 | 348/187 |
| 8,866,914 B2 * | 10/2014 | Murase | H04N 17/02 | 348/177 |
| 8,970,709 B2 * | 3/2015 | Gonzalez-Banos | G01C 11/02 | 345/419 |
| 9,008,460 B2 * | 4/2015 | Shechtman | G06T 5/00 | 382/103 |
| 9,039,194 B2 * | 5/2015 | Tannhauser | H04N 9/3147 | 345/634 |
| 9,532,018 B2 * | 12/2016 | Ishikawa | G06T 3/005 | |
| 9,661,257 B2 * | 5/2017 | Ishikawa | G06T 3/005 | |
| 2003/0160877 A1 * | 8/2003 | Sumida | H04N 9/735 | 348/223.1 |
| 2005/0105057 A1 * | 5/2005 | Matsuda | H04N 9/3194 | 353/70 |
| 2008/0062164 A1 * | 3/2008 | Bassi | H04N 9/3147 | 345/214 |
| 2008/0143740 A1 * | 6/2008 | Wilensky | G06T 11/60 | 345/619 |
| 2009/0274373 A1 * | 11/2009 | Huang | G06T 7/13 | 382/201 |
| 2012/0127171 A1 * | 5/2012 | Li | G06T 7/0026 | 345/419 |
| 2014/0003706 A1 * | 1/2014 | Davidson | G06K 9/00201 | 382/154 |
| 2014/0184815 A1 * | 7/2014 | Lin | H04N 17/002 | 348/188 |
| 2014/0267427 A1 * | 9/2014 | Hasegawa | G06T 5/006 | 345/647 |
| 2015/0029222 A1 * | 1/2015 | Hofmann | G06K 9/00993 | 345/633 |
| 2015/0029465 A1 * | 1/2015 | Ishikawa | G06T 3/005 | 353/30 |
| 2015/0077573 A1 * | 3/2015 | Ishikawa | G06T 3/005 | 348/189 |
| 2015/0109418 A1 * | 4/2015 | Lin | G01B 11/2522 | 348/47 |
| 2015/0146215 A1 * | 5/2015 | Kobayashi | G01B 11/2513 | 356/610 |
| 2015/0178910 A1 * | 6/2015 | Lin | G06T 7/80 | 382/154 |
| 2015/0189267 A1 * | 7/2015 | Kaji | G06T 7/80 | 348/187 |
| 2015/0260505 A1 * | 9/2015 | Nagano | G06T 3/00 | 348/135 |
| 2015/0302560 A1 * | 10/2015 | Sumiyoshi | G09G 3/001 | 382/203 |
| 2016/0142644 A1 * | 5/2016 | Lin | H04N 5/23238 | 348/143 |
| 2016/0196634 A1 * | 7/2016 | Mitsunami | H04N 5/225 | 348/222.1 |
| 2017/0069107 A1 * | 3/2017 | Kobayashi | G06T 7/004 | |

FOREIGN PATENT DOCUMENTS

| | | |
|---|---|---|
| TW | I359325 | 3/2012 |
| TW | I371723 | 9/2012 |
| TW | 201401874 | 1/2014 |
| TW | I434069 | 4/2014 |
| TW | I454147 | 9/2014 |
| TW | I456335 | 10/2014 |
| TW | I484283 | 5/2015 |
| TW | I497448 | 8/2015 |
| TW | 201607324 | 2/2016 |

OTHER PUBLICATIONS

"SL 3D Printer—Nobel 1.0," XYZ Printing, Retrieved on Nov. 9, 2016, Available at: http://us.xyzprinting.com/us_en/Product/Nobel-1.0.

"3D Printers—The Form 1+," Formlabs, Retrieved on Nov. 9, 2016, Available at: http://formlabs.com/products/3d-printers/form-1-plus/.

"Office Action of Taiwan Counterpart Application", dated Feb. 17, 2017, p. 1-p. 5.

"Search Report of Europe Counterpart Application", dated Aug. 31, 2017, p. 1-p. 7.

* cited by examiner

IMAGE CORRECTION METHOD OF PROJECTOR AND IMAGE CORRECTION SYSTEM

CROSS-REFERENCE TO RELATED APPLICATION

This application claims the priority benefit of Taiwan application serial no. 105126843, filed on Aug. 23, 2016. The entirety of the above-mentioned patent application is hereby incorporated by reference herein and made a part of this specification.

BACKGROUND OF THE INVENTION

1. Field of the Invention

The invention relates to an image processing method and a system thereof, and more particularly, to an image correction method of projector and an image correction system.

2. Description of Related Art

Generally, a lighting source is provided inside a projector to project images onto a physical plane through an optical lens set for viewing. The projector also plays an important role as a key element in a structure light three dimension (3D) scanner and a photocuring 3D printer. However, a projection picture outputted from the projector may show deformations due to internal design of the optical lens set disposed.

There are two major factors causing the deformations on the picture. One of the factors can easily lead to a distortion caused by light refracted onto a projective plane. The other factor can lead to a keystone effect, which is caused by an optical axis not perpendicular to the projective plane or a skew offset generated by installment of the optical lens set. As an example of the distortion, in the case where an image originally transmitted to the projector is a square, a square exterior should be outputted under ideal projection conditions. Nonetheless, owing to the optical lens set being disposed, most of the projectors will show the distortion, commonly including a barrel distortion and a pincushion distortion. This type of distortion needs to be described with use of a non-linear equation. On the other hand, the keystone effect may be simply expressed by using a linear deformation approach.

SUMMARY OF THE INVENTION

The invention is directed to an image correction of projector and an image correction system, which are capable of synchronously correcting the linear keystone effect and the non-linear distortion of projector.

The image correction method of projector according to the invention includes: shooting a physical calibration panel by an image capturing apparatus to obtain a first image, wherein the physical calibration panel is arranged on a location where a projection screen of a projector is located; analyzing the first image by using a processor to obtain a first calibration parameter and a first homography matrix of the image capturing apparatus; shooting an outputting image of a calibration panel pattern on the projection screen outputted from the projector by the image capturing apparatus to obtain a second image; performing an undistorting operation for the second image based on the first calibration parameter by using the processor to obtain a third image; analyzing the third image by using the processor to obtain a second calibration parameter and a second homography matrix of the projector; and performing a compensating operation for an original image to be outputted from the projector based on the second calibration parameter, the second homography matrix and the first homography matrix by the processor to obtain a compensated image, so as to output the compensated image on the projection screen from the projector.

In an embodiment of the invention, the first calibration parameter includes a first internal parameter and a first distortion parameter. The step of analyzing the first image by using the processor to obtain the first calibration parameter and the first homography matrix of the image capturing apparatus includes: setting the first internal parameter based on a resolution of the first image; calculating the first distortion parameter based on the first internal parameter; performing the undistorting operation based on the first distortion parameter to obtain a first undistorted image; and calculating the first homography matrix according to the first undistorted image and a coordinate matrix corresponding to the physical calibration panel.

In an embodiment of the invention, the second calibration parameter includes a second internal parameter and a second distortion parameter. The step of analyzing the third image by using the processor to obtain the second calibration parameter and the second homography matrix of the projector includes: setting the second internal parameter based on a resolution of the third image; calculating the second distortion parameter based on the second internal parameter; performing the undistorting operation based on the first distortion parameter to obtain a first undistorted image; and calculating the second homography matrix according to the second undistorted image and a coordinate matrix corresponding to the calibration panel pattern.

In an embodiment of the invention, the step of performing the compensating operation for the original image to be outputted from the projector based on the second calibration parameter, the second homography matrix and the first homography matrix by the processor to obtain the compensated image includes: performing an inverse homography transformation operation for the original image by using the second homography matrix to obtain a first corrected image; performing the undistorting operation for the first corrected image by using the second calibration parameter to obtain a second corrected image; performing a homography transformation operation for the second corrected image by using the second homography matrix to obtain a third corrected image; and performing the homography transformation operation for the third corrected image by using the first homography matrix to obtain the compensated image.

In an embodiment of the invention, the image capturing apparatus and the projector are located on the same side of the projection screen, or the image capturing apparatus and the projector are located on different sides of the projection screen.

The image correction system of the invention includes: a projector; an image capturing apparatus, shooting a physical calibration panel arranged on a location where a projection screen of a projector is located to obtain a first image, and shooting an outputting image of a calibration panel pattern on the projection screen outputted from the projector to obtain a second image; and a processor, coupled to the image capturing apparatus and the projector. The processor analyzes the first image to obtain a first calibration parameter and a first homography matrix of the image capturing apparatus; the processor performs an undistorting operation for the second image based on the first calibration parameter to obtain a third image; the processor analyzes the third image to obtain a second calibration parameter and a second homography matrix of the projector; the processor performs a compensating operation for an original image to be outputted from the projector based on the second calibration parameter, the second homography matrix and the first homography matrix to obtain a compensated image, so as to output the compensated image on the projection screen from the projector.

Based on the above, by shooting the physical calibration panel and the outputting image on the projection screen through the additionally disposed image capturing apparatus to obtain the two images, the linear deformation mode and the non-linear deformation mode in the projector may be calculated and used to perform the compensating operation for the original image expected to be projected. Accordingly, the compensated image that is already added with undistorted factors may present the picture with the same proportion as the original image after being outputted from the projector. As a result, the issue of the deformations on the output picture of the projector may be solved while achieving the effectiveness of accurate positioning.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
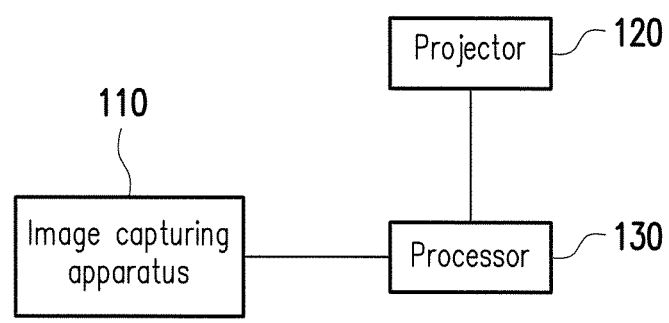
FIG. 1 is a block diagram of an image correction system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an image correction system according to an embodiment of the invention. Referring to FIG. 1, an image correction system 100 includes an image capturing apparatus 110, a projector 120 and a processor 130. Here, the processor 130 is connected to each of the image capturing apparatus 110 and the projector 120 by ways of wired connection or wireless connection. That is to say, the image capturing apparatus 110 and the projector 120 are communicated with the processor 130 by ways of wired connection or wireless connection so the processor 130 is able to receive data from the image capturing apparatus 110 and transmit the data to the projector 120.

The image capturing apparatus 110 is, for example, a camcorder or camera using a charge coupled device (CCD) lens or a complementary metal oxide semiconductor transistor (CMOS).

The projector 120 is, for example, a video projector including a cathode ray tube (CRT) projector, a liquid-crystal display (LCD) projector, a digital light processing (DLP) projector, a liquid crystal on silicon (LCoS) projector, and a light-emitting diode (LED) projector. However, the invention is not limited to the above, and any device with suitable specification may be adopted in consideration of different resolutions and different brightness contrasts.

The processor 130 is, for example, a central processing unit (CPU), a graphic processing unit (GPU), a physics processing unit (PPU), a microprocessor, an embedded control chip, a digital signal processor (DSP), an application specific integrated circuits (ASIC) or other similar devices.

In the image correction system 100, the image capturing apparatus 110 is used to take two images. One of the images is obtained by shooting a physical calibration panel arranged on a location where a projection screen is located, and the other image is obtained by shooting an outputting image of a calibration panel pattern on projection screen outputted from the projector 120. The processor 130 can calculate a linear deformation mode and a non-linear deformation mode in the projector 120 according to the two images and further inversely correct an original image expected to be projected based on the linear deformation mode and the non-linear deformation mode so a projected picture can maintain the same proportion as the original image expected to be projected. Here, a pattern on the physical calibration panel and the calibration panel pattern is, for example, a regular grid pattern, but the invention is not limited thereto.

In the present embodiment, the processor 130 is, for example, disposed in another independent electronic device. Further, the image capturing apparatus 110 and the projector 120 are located on the same side of the projection screen, or the image capturing apparatus 110 and the projector 120 are located on different sides of the projection screen.

Figure 2A:
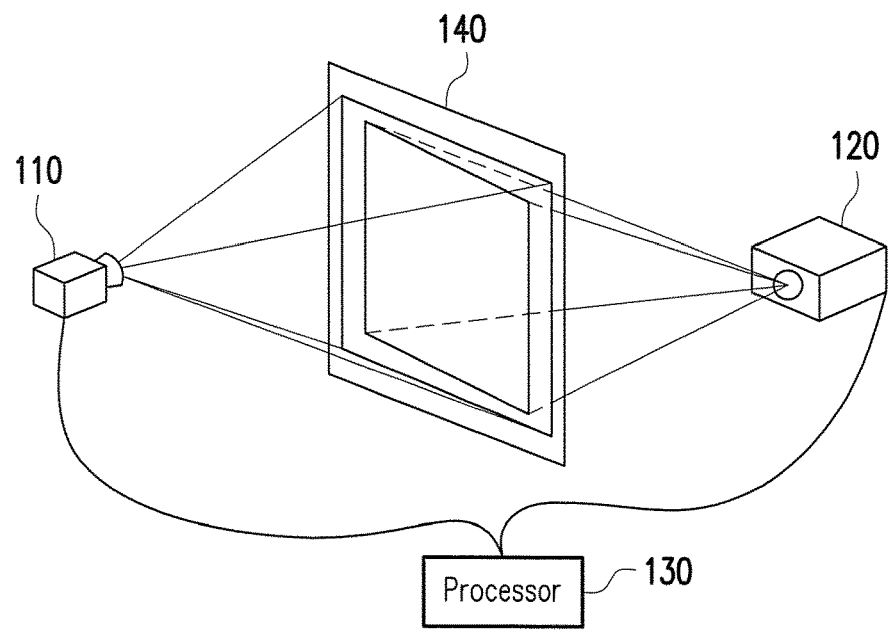
FIG. 2A and FIG. 2B are schematic diagrams illustrating configurations of the image correction system according to an embodiment of the invention.
Figure 2B:
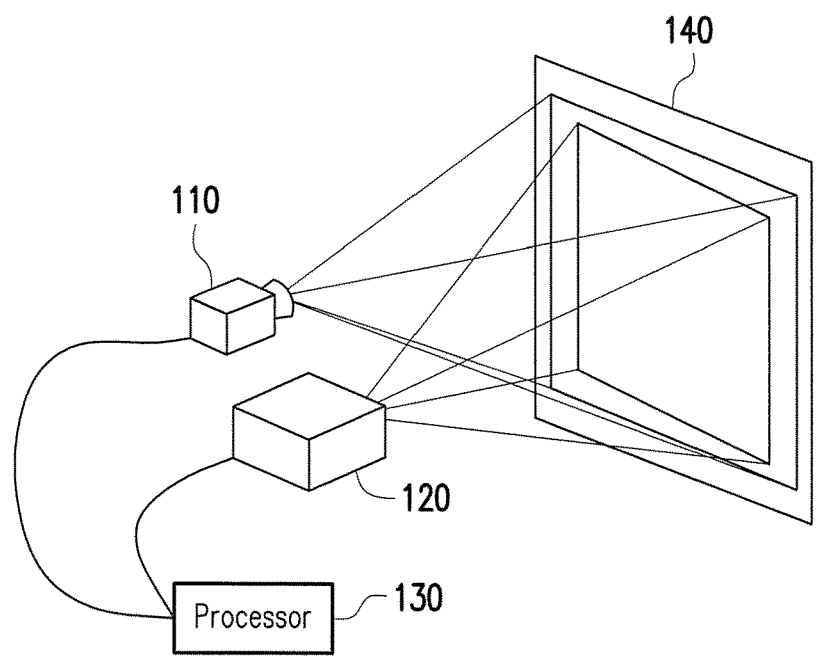

For instance, FIG. 2A and FIG. 2B are schematic diagrams illustrating configurations of the image correction system according to an embodiment of the invention. FIG. 2A shows that the image capturing apparatus 110 and the projector 120 are located on different sides of a projection screen 140. FIG. 2B shows that the image capturing apparatus 110 and the projector 120 are located on the same side of the projection screen 140.

Furthermore, in other embodiments, the processor 130 may be built-in inside the projector 120; or the processor 130 may be disposed inside the image capturing apparatus 110. In other embodiments, the image capturing apparatus 110, the processor 130 and the projector 120 may be integrated into one device, such as a personal computer, a notebook computer, a smart phone and a tablet computer each having photo-taking, video-taking and projecting capabilities, but the invention is not limited to the above.

Figure 3:
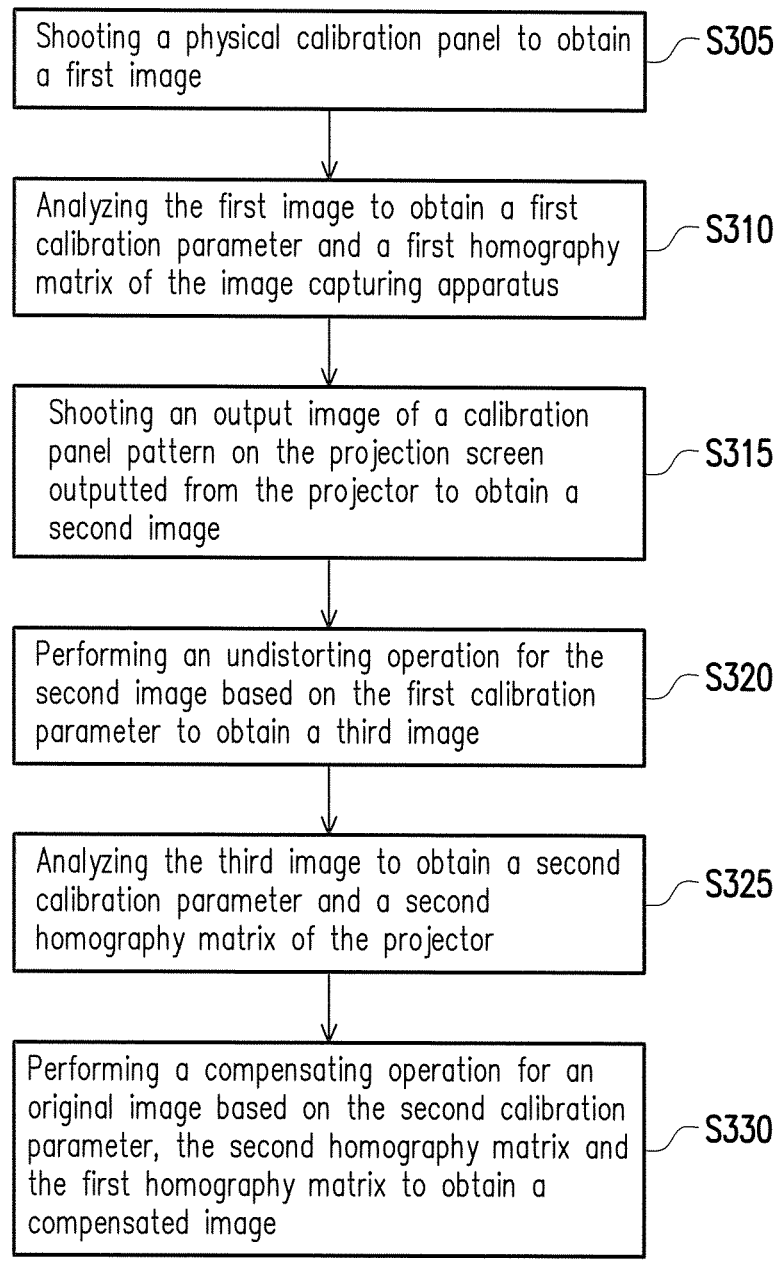
FIG. 3 is a flowchart of an image correction method of processor according to an embodiment of the invention.

Each step in the image correction method of projector will be described below with reference to the image correction system 100. FIG. 3 is a flowchart of an image correction method of processor according to an embodiment of the invention.

Referring to FIG. 1 to FIG. 3 together, in step S305, a physical calibration panel is shot by the image capturing apparatus 110 to obtain a first image. Here, the physical calibration panel is arranged on a location where the projection screen 140 of the projector 120 is located. For example, at one side of the projection screen 140 provided as a shooting target for the image capturing apparatus 110, a calibration thin plate (the physical calibration panel) may be placed for the image capturing apparatus 110 to shoot. After the first image is obtained through shooting, the image capturing apparatus 110 transmits the first image to the processor 130 so the subsequent image analysis process may be proceeded (i.e., step S310 is performed).

In step S310, the processor 130 analyzes the first image to obtain a first calibration parameter and a first homography matrix of the image capturing apparatus 110. For example, the first calibration parameter includes a first internal parameter and a first distortion parameter. After the first internal parameter and the first distortion parameter are obtained from the first image, an undistorting operation is performed based on the first distortion parameter to obtain a first undistorted image. Also, the processor 130 calculates a first homography matrix according to the first undistorted image and a coordinate matrix corresponding to the physical calibration panel. The homography matrix includes a combination of matrices regarding rotation, transition, scaling, affine and perspective projection of the image. The first homography matrix underwent matrix decomposition may be used to correct the keystone effect of the first image.

The keystone effect is a common distortion in cameras or projectors. In less serious cases, the keystone effect may be corrected by using a linear interpolation. Yet, the linear interpolation is unable to conduct a correction on offsets generated in depth. Therefore, a perspective projection (i.e., a homography correction) is used in the present embodiment to conduct the correction.

The distortion parameters (the first distortion parameter and a second distortion parameter (which will be described later)) are usually represented a polynomial and used to describe the barrel distortion or pincushion distortion caused by lenses. In other words, after the undistorting operation is perfoinied by the processor 130 for an image under test by using the distortion parameter, the generated undistorted image can be used to correct the image back to a mathematical model similar to that of a pinhole projection.

Further, in step S315, an outputting image of a calibration panel pattern on the projection screen 140 outputted from the projector 120 is shot by the image capturing apparatus 110 to obtain a second image. Here, a semi-transparent material (e.g., a very thin paper) on which projection may be formed may be disposed to serve as the projection screen 140. After the second image is obtained through shooting, the image capturing apparatus 110 transmits the second image to the processor 130 for the subsequent analysis.

Then, in step S320, the processor 130 performs the undistorting operation for the second image based on the first calibration parameter to obtain a third image. That is to say, the factor leading to the distortion caused by the image capturing apparatus 110 is eliminated from the second image to obtain the third image. Then, the processor 130 performs the subsequent image analysis process for the third image (i.e., step S325 is performed).

In step S325, the processor 130 analyzes the third image to obtain a second calibration parameter and a second homography matrix of the projector 120. For example, the second calibration parameter includes a second internal parameter and a second distortion parameter. The processor 130 sets the second internal parameter based on a resolution of the third image and then calculates the second distortion parameter based on the second internal parameter. Thereafter, the undistorting operation may be performed based on the second distortion parameter to obtain a second undistorted image, and then the second homography matrix may be calculated according to the second undistorted image and a coordinate matrix corresponding to the calibration panel pattern.

Then, in step S330, the processor 130 performs a compensating operation for an original image to be outputted from the projector 120 based on the second calibration parameter, the second homography matrix and the first homography matrix to obtain a compensated image, so as to output the compensated image on the projection screen 140 from the projector 120.

Figure 4:
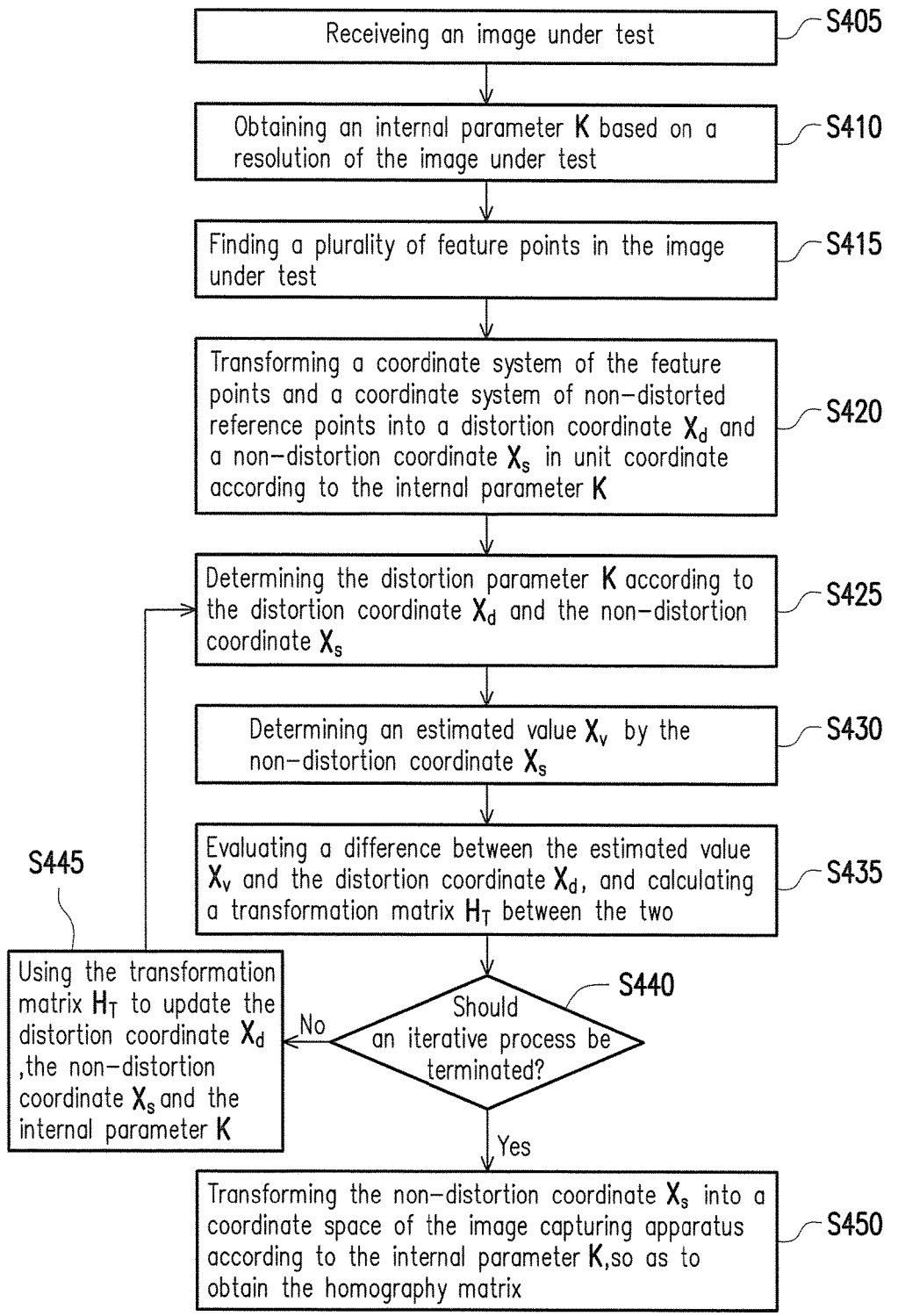
FIG. 4 is a flowchart of an image analysis method according to the invention.

Steps regarding to the image analysis process in step S310 and step S325 will be further described with reference to the example provided below. FIG. 4 is a flowchart of an image analysis method according to the invention. In the present embodiment, the image (the first image or the third image) to which the processor 130 intends to perform the analysis is referred to as an image under test. The processor 130 is used to calculate an internal parameter K, a distortion parameter k and a homography matrix of the image under test.

First of all, in step S405, the processor 130 receives an image under test. Here, the image under test may be the first image or the third image as described above. Next, in step S410, the processor 130 obtains the internal parameter K based on a resolution of the image under test. In the present embodiment, the internal parameter K is a hypothetical internal parameter, used as a unit area in a mapping operation when correcting the distortions rather than an actual internal parameter of the image capturing apparatus 110. For example, the processor 130 first obtains the internal parameter K based on Equation (1) below. In Equation (1), w and h represent width and height of the image under test, respectively. That is, w and h are a resolution of the image shot by the image capturing apparatus 110.

$$K = \begin{bmatrix} w & 0 & w/2 \\ 0 & h & h/2 \\ 0 & 0 & 1 \end{bmatrix} \quad \text{Equation (1)}$$

Then, in step S415, the processor 130 uses a features detecting method to find a plurality of feature points $X_p$ in the image under test. In the case of the grid pattern, corner points of the black and white squares within the grids are so-called the feature points.

Then, in step S420, a coordinate system of the feature points $X_p$ and a coordinate system of non-distorted reference points are transformed into a distortion coordinate $X_d$ and a non-distortion coordinate $X_s$ in unit coordinate according to the internal parameter K. As shown by Equation (2) below, after multiplying each of the feature points $X_p$ by $K^{-1}$ each of the feature points $X_p$ is then mapped to a designated range (e.g., a range from −1 to +1) to obtain the distortion coordinate $X_d$ regulated under distortion condition.

$$X_d = \begin{bmatrix} x_d \\ y_d \end{bmatrix} = K^{-1} X_p \quad \text{Equation (2)}$$

Further, assuming that the grid pattern of the image under test has 8×13 feature points and one non-distortion reference pattern (having 8×13 reference points) is set based on the original grid pattern, the non-distortion coordinate $X_s$ refers to the non-distortion feature points in the reference pattern and is also a regulated coordinate (within a numerical range from −1 to +1).

Next, in step S425, the distortion parameter k is determined according to the distortion coordinate $X_d$ and the non-distortion coordinate $X_s$. After obtaining a correspondence relation between the distortion coordinate $X_d$ and the non-distortion coordinate $X_s$ in unit coordinate, the two coordinates must satisfy Equation (3).

$$X_d = \begin{bmatrix} x_d \\ y_d \end{bmatrix}$$
$$= (1 + k_0 r^2 + k_1 r^4 + k_4 r^6)\begin{bmatrix} x_s \\ y_s \end{bmatrix} + \begin{bmatrix} 2k_2 x_s y_s + k_3(r^2 + 2x_s^2) \\ k_2(r^2 + 2y_s^2) + 2k_3 x_s y_s \end{bmatrix}$$
Equation (3)

In Equation (3), $r^2 = x_s^2 + y_s^2$, and $X_s = [x_s, y_s]^T$ is a linear non-distortion coordinate. The processor 130 uses Equation (3) to determine the distortion parameter k of the image under test. Generally, a high power polynomial may be adopted to describe the distortion parameter k. For example, the distortion parameter k includes 5 coefficients, $k = [k_0, k_1, k_2, k_3, k_4]$, in the present embodiment. However, the number of coefficients included by the distortion parameter k may be modified based on demands in other embodiments. In order to solve the distortion parameter k, Equation (3) may be rewritten into Equation (4) below. After collecting at least four corresponding points, the distortion parameter k may be solved by a least square method, or may be calculated by a singular value decomposition (SVD).

$$\begin{bmatrix} x_s r^2 & x_s r^4 & 2x_s y_s & r^2 + 2x_s^2 & x_s r^6 \\ y_s r^2 & y_s r^4 & r^2 + 2y_s^2 & 2x_s y_s & y_s r^6 \end{bmatrix}\begin{bmatrix} k_0 \\ k_1 \\ k_2 \\ k_3 \\ k_4 \end{bmatrix} = \begin{bmatrix} x_d - x_s \\ y_d - y_s \end{bmatrix}$$
Equation (4)

The unitized distortion coordinate $X_d$ must be multiplied by the internal parameter K, e.g., Equation (5) to be transformed into the feature points $X_p$ in real use. Similarly, the linear non-distortion coordinate $X_s$ may also be transformed into a real coordinate system (in pixels) by the internal parameter K. In the mode for processing the distortion, it is preferred to perform operations in the unitized coordinate system in the present embodiment, so an approximation operation for the distortions may be performed in the state of satisfying approximate symmetry and approximate unit circle. The real coordinate system and the unitized coordinate system may be obtained by using the internal parameter or an inverse matrix operation thereof.

$$X_p = KX_d = K\begin{bmatrix} x_d \\ y_d \\ 1 \end{bmatrix}$$
Equation (5)

After the distortion parameter k is solved, an estimated value $X_v$ is determined by the non-distortion coordinate $X_s$ in step S430. For example, $X_d$ obtained by substituting the non-distortion coordinate $X_s$ into Equation (3) above may be regarded as the estimated value $X_v$. This is because the distortion coordinate $X_d$ is measurable by, for example, multiplying each of the corner points within the grid pattern by $K^{-1}$; and yet the estimated value $X_v$ is not an actually measured value, and thus the result obtained by substituting the non-distortion coordinate $X_s$ into Equation (3) is additionally defined as the estimated value $X_v$.

Then, in step S435, a difference between the estimated value $X_v$ and the distortion coordinate $X_d$ is evaluated, and a transformation matrix $H_T$ between the two is calculated. In step S440, whether to terminate an iterative process is determined. If no, the method proceeds to step S445; if yes, the method proceeds to step S450. For example, if the difference between the estimated value $X_v$ and the distortion coordinate $X_d$ is higher than a set value, the iterative process is continuously performed. That is to say, in step S445, the transformation matrix $H_T$ between the estimated value $X_v$ and the distortion coordinate $X_d$ is used to update the distortion coordinate $X_d$, the non-distortion coordinate $X_s$ and the internal parameter K, as shown below. For example, $X_s = H_T X_s$; $X_d = H_T^{-1} X_d$; $K = H_T K$. Here, aforesaid transformation matrix $H_T$ is also a homography matrix.

After the distortion coordinate $X_d$, the non-distortion coordinate $X_s$ and the internal parameter K are updated, step S425 is re-performed to obtain the distortion parameter k by using Equation (4), then the difference between the estimated value $X_v$ and the distortion coordinate $X_d$ is re-evaluated, and the iterative process is performed repeatedly in this way. The iterative process may be terminated to obtain the final internal parameter K and the final distortion parameter k when a deviation between the estimated value $X_v$ and distortion coordinate $X_d$ underwent the iterations is lower than a limited value or when the number of the iterations is higher than a specific value.

After it is determined to terminate the iterative process, in step S450, the homography matrix (the first homography matrix $H_c$ or the second homography matrix $H_p$) may be obtained by transforming the non-distortion coordinate $X_s$ into a coordinate space of the image capturing apparatus 110 according to the internal parameter K. That is to say, the first homography matrix regarding the coordinate space of the image capturing apparatus 110 and the physical calibration panel is calculated, or the second homography matrix $H_p$ regarding the coordinate space of the image capturing apparatus 110 and a coordinate space of the calibration panel pattern inputted to the projector 120 is calculated.

For example, the homography matrix (the first homography matrix $H_c$ or the second homography matrix $H_p$) may be obtained by multiplying the non-distortion coordinate $X_s$ by the internal parameter K to be transformed into the coordinate space of the image capturing apparatus 110, and calculating the keystone effect by using $KX_s$ and the coordinate of the calibration panel. Here, $KX_s$ are feature points in an ideal undistorted image. If the internal parameter K may be calculated accurately, $KX_s$ will be very close to the feature points in the actual undistorted image.

Example is provided below to describe the mathematical model of the keystone effect. For example, an operation expression of the homography correction for four or more points may be represented by Equation (A) below.

$$X_i' = HX_i$$
Equation (A)

A homography matrix H (the first homography matrix $H_c$ or the second homography matrix $H_p$) is, for example, a 3×3 matrix. Here, the homography matrix is used to describe a plane coordinate (the first undistorted image underwent the undistorting operation) shot by the image capturing apparatus 110, or may be regarded as a plane coordinate (the second undistorted image underwent the undistort g operation) projected by the projector 120. In order to solve the homography matrix H, it is assumed that, after mapping to a known coordinate space ($HX_i$), the feature points of the coordinate space of the image capturing apparatus 110 has a cross product with respect to the feature points $X'_i$ on the known coordinate space being zero vector, as shown in Equation (B). Also, a homogeneous coordinate value of the feature points $X_i'$ of the known coordinate space is shown by Equation (C)

$$X_i' \times HX_i = 0 \quad \text{Equation (B)}$$

$$X_i' = [x_i', y_i', w_i']^T \quad \text{Equation (C)}$$

Further, column vectors of the homography matrix H are represented by $h^{1T}$, $h^{2T}$ and $h^{3T}$, respectively, as shown in Equation (D).

$$H = \begin{bmatrix} h^{1T} \\ h^{2T} \\ h^{3T} \end{bmatrix} \quad \text{Equation (D)}$$

Equation (B) may be re-written and simplified into Equation (E), and by which the homography matrix H may be solved by using the singular value decomposition (SVD).

$$\begin{bmatrix} 0^T & -w_i' X_i^T & y_i' X_i^T \\ w_i' X_i^T & 0^T & -x_i' X_i^T \end{bmatrix} \begin{pmatrix} h^1 \\ h^2 \\ h^3 \end{pmatrix} = 0 \quad \text{Equation (E)}$$

The calculated homography matrix H is equivalent to one regression matrix. Therefore, according to the homography matrix, by multiplying any one point $X_i$ on the coordinate system shot by the image capturing apparatus 110 by the homography matrix H, a corresponding coordinate value $X_i'$ of the known coordinate system may be calculated.

After the first image is obtained, the processor 130 may obtain the first internal parameter $K_c$, the first distortion parameter $k_c$ and the first homography matrix $H_c$ from the first image by using aforesaid steps S405 to S450. Then, after the second image is obtained, the processor 130 performs the undistorting operation for the second image by using the first internal parameter $K_c$ and the first distortion parameter $k_c$, so as to eliminate the distortion caused by the image capturing apparatus 110 in the second image to thereby obtain the third image. Then, the processor 130 obtains the second internal parameter $K_p$, the second distortion parameter $k_p$ and the second homography matrix $H_p$ from the third image by using aforesaid steps S405 to S450 again.

After obtaining each of the parameters, the processor 130 can then perform the compensating operation for the original image to be outputted from the projector 120 in order to obtain the compensated image. Here, it is assumed that the original image to be outputted from the projector 120 is I.

First, an inverse homography transformation operation is performed for the original image I by using the second homography matrix $H_p$ to obtain a first corrected image $H_p^{-1}I$. Then, the undistorting operation for the first corrected image $H_p^{-1}I$ by using the second calibration parameter (the second internal parameter $K_p$ and the second distortion parameter $k_p$) to obtain the second corrected image undist($H_p^{-1}I$). A homography transformation operation is performed for the second corrected image undist($H_p^{-1}I$) by using the second homography matrix $H_p$ to obtain a third corrected image I'. That is, I'=$H_p$(undist($H_p^{-1}I$)).

The distortion of the original image I may be compensated according to aforementioned actions. Lastly, if the keystone effect is to be corrected at the same time, the keystone effect may be corrected simply by using the first homography matrix $H_c$e. That is, the homography transformation operation is performed for the third corrected image I' by using the first homography matrix $H_c$ to obtain a fourth corrected image I", and the fourth corrected image I" is used as the compensated image. More specifically, the first homography matrix $H_c$ may be further decomposed into a projection transformation matrix, an affine transformation matrix and a similarity transformation matrix $H_s$. That is, $H_c = H_s H_{ap}$. Among them, $H_{ap}$ includes a combination of operations for affine, projection and transition. In other words, $H_{ap}$ is capable of eliminating projection effects of the third corrected image I', that is, a projection distortion may be generated according to a position of its own shape center so the similarity transformation matrix $H_s$ may be used to correct a difference between the third corrected image I' and the physical calibration panel. Accordingly, by combining the operations for correcting the keystone effect and the distortion, the compensated fourth corrected image is I"=$H_p H_{ap}^{-1}$(undist($H_p^{-1}I$)). Alternatively, the compensated fourth corrected image may also be known as I"'= $H_p H_{ap}^{-1} H_p^{-1}$I' after transforming the third image.

For example, in the case of a perfect circle, after the compensating operation, the compensated image is an image already being distorted. As such, when the compensated image is outputted from the projector 120, the output circle can maintain at a projection state of the perfect circle.

In summary, in the foregoing embodiments, two images are shot on the projection screen of the projector, one of the images is obtained by shooting the physical calibration panel, and the other image is obtained by shooting the calibration panel pattern projected from the projector. The linear deformation mode and the non-linear deformation mode in the projector may be calculated according to the two images and then further inversely correct an original image expected to be projected based on the linear deformation mode and the non-linear deformation mode so a projected picture can maintain the same proportion as the original image expected to be projected. This technique is capable of significantly simplifying the required hardware design.

It is known that the projector may also be used in the 3D scanner and 3D printer in addition to normal displaying usages, and the thus the corrected projector is also capable of significantly improving the application in precise 3D scanning and precise 3D printing. Because the 3D scanner and 3D printer do adopt various projectors at the present stage and pursuit for improved accuracy of the projection, the foregoing embodiments may be used to effectively solve the linear and non-linear deformation generated during assembly, so as to further provide the improved accuracy of the projection as key technique adopting most of the global wide 3D application projectors at the present stage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image correction method of projector, comprising:
shooting a physical calibration panel by an image capturing apparatus to obtain a first image, wherein the physical calibration panel is arranged on a location where a projection screen of a projector is located;
analyzing the first image by using a processor to obtain a first calibration parameter and a first homography matrix of the image capturing apparatus, wherein the first calibration parameter comprises a first internal parameter and a first distortion parameter, the first internal parameter is set based on a resolution of the first image, wherein a width and a height of the first image are the resolution of the first image;
shooting an outputting image of a calibration panel pattern on the projection screen outputted from the projector by the image capturing apparatus to obtain a second image;
performing an undistorting operation for the second image based on the first internal parameter and the first distortion parameter by using the processor to obtain a third image;
analyzing the third image by using the processor to obtain a second calibration parameter and a second homography matrix of the projector, wherein the second calibration parameter comprises a second internal parameter and a second distortion parameter, the second internal parameter is set based on a resolution of the third image, wherein a width and a height of the third image are the resolution of the third image; and
performing a compensating operation for an original image to be outputted from the projector based on the second calibration parameter, the second homography matrix and the first homography matrix by the processor to obtain a compensated image, so as to output the compensated image on the projection screen from the projector,
wherein the first image and the third image are respectively taken as an image under test, and an internal parameter K and a distortion parameter k of the image under test are calculated, the internal parameter K is the first internal parameter or the second internal parameter, and the distortion parameter k is the first distortion parameter or the second distortion parameter, and step of calculating the internal parameter K and the distortion parameter k of the image under test comprising:
obtaining the internal parameter K based on a width w and a height h of the image under test, wherein $$K = \begin{bmatrix} w & 0 & w/2 \\ 0 & h & h/2 \\ 0 & 0 & 1 \end{bmatrix};$$

finding a plurality of feature points $X_p$ in the image under test;
multiplying each of the feature points $X_p$ by $K^{-1}$ to obtain a distortion coordinate $X_d$;
setting a non-distortion reference pattern, wherein a non-distortion coordinate $X_s$ refers to non-distortion feature points in the reference pattern;
determining the distortion parameter k according to the distortion coordinate $X_d$ and the non-distortion coordinate $X_s$, wherein the distortion coordinate $X_d$ and the non-distortion coordinate $X_s$ satisfy following Equation:

$$X_d = \begin{bmatrix} x_d \\ y_d \end{bmatrix}$$
$$= (1 + k_0 r^2 + k_1 r^4 + k_4 r^6)\begin{bmatrix} x_s \\ y_s \end{bmatrix} + \begin{bmatrix} 2k_2 x_s y_s + k_3(r^2 + 2x_s^2) \\ k_2(r^2 + 2y_s^2) + 2k_3 x_s y_s \end{bmatrix},$$

and $$r^2 = x_s^2 + y_s^2, X_s = [x_s, y_s]^T, k = [k_0, k_1, k_2, k_3, k_4,];$$

wherein step of performing the undistorting operation for the second image based on the first calibration parameter by using the processor comprise:
performing the undistorting operation for the second image based on the first internal parameter and the first distortion parameter to eliminate the distortion caused by the image capturing apparatus in the second image to thereby obtain the third image.

2. The image correction method of projector according to claim 1, wherein the step of analyzing the first image by using the processor to obtain the first calibration parameter and the first homography matrix of the image capturing apparatus comprises:
performing the undistorting operation based on the first distortion parameter to obtain a first undistorted image; and
calculating the first homography matrix according to the first undistorted image and a coordinate matrix corresponding to the physical calibration panel.

3. The image correction method of projector according to claim 1, wherein the step of analyzing the third image by using the processor to obtain the second calibration parameter and the second homography matrix of the projector comprises:
performing the undistorting operation based on the second distortion parameter to obtain a second undistorted image; and
calculating the second homography matrix according to the second undistorted image and a coordinate matrix corresponding to the calibration panel pattern.

4. The image correction method of projector according to claim 1, wherein the step of performing the compensating operation for the original image to be outputted from the projector based on the second calibration parameter, the second homography matrix and the first homography matrix by the processor to obtain the compensated image comprises:
performing an inverse homography transformation operation for the original image by using the second homography matrix to obtain a first corrected image;
performing the undistorting operation for the first corrected image by using the second internal parameter and the second distortion parameter to obtain a second corrected image;
performing a homography transformation operation for the second corrected image by using the second homography matrix to obtain a third corrected image; and
performing the homography transformation operation for the third corrected image by using the first homography matrix to obtain a fourth corrected image, which is the compensated image.

5. The image correction method of projector according to claim 1, wherein the image capturing apparatus and the projector are located on the same side of the projection screen, or the image capturing apparatus and the projector are located on different sides of the projection screen.

6. An image correction system, comprising:
a projector;
an image capturing apparatus, shooting a physical calibration panel arranged on a location where a projection screen of a projector is located to obtain a first image, and shooting an outputting image of a calibration panel pattern on the projection screen outputted from the projector to obtain a second image; and
a processor, coupled to the image capturing apparatus and the projector;
wherein the processor analyzes the first image to obtain a first calibration parameter and a first homography matrix of the image capturing apparatus, wherein the first calibration parameter comprises a first internal parameter and a first distortion parameter, the first internal parameter is set based on a resolution of the first image, wherein a width and a height of the first image are the resolution of the first image; the processor performs an undistorting operation for the second image based on the first internal parameter and the first distortion parameter to obtain a third image; the processor analyzes the third image to obtain a second calibration parameter and a second homography matrix of the projector, wherein the second calibration parameter comprises a second internal parameter and a second distortion parameter, the second internal parameter is set based on a resolution of the third image, wherein a width and a height of the third image are the resolution of the third image; the processor performs a compensating operation for an original image to be outputted from the projector based on the second calibration parameter, the second homography matrix and the first homography matrix to obtain a compensated image, so as to output the compensated image on the projection screen from the projector,
wherein the processor takes the first image and the third image respectively taken as an image under test, and calculates an internal parameter K and a distortion parameter k of the image under test, wherein the internal parameter K is the first internal parameter or the second internal parameter, and the distortion parameter k is the first distortion parameter or the second distortion parameter, and step of calculating the internal parameter K and the distortion parameter k of the image under test comprises:
obtaining the internal parameter K based on a width w and a height h of the image under test, wherein $$K = \begin{bmatrix} w & 0 & w/2 \\ 0 & h & h/2 \\ 0 & 0 & 1 \end{bmatrix};$$

finding a plurality of feature points $X_p$ in the image under test;
multiplying each of the feature points $X_p$ by $K^{-1}$ to obtain a distortion coordinate $X_d$;

setting a non-distortion reference pattern, wherein a non-distortion coordinate $X_s$ refers to non-distortion feature points in the reference pattern;
determining the distortion parameter k according to the distortion coordinate $X_d$ and the non-distortion coordinate $X_s$, wherein the distortion coordinate $X_d$ and the non-distortion coordinate $X_s$ satisfy following Equation:

$$X_d = \begin{bmatrix} x_d \\ y_d \end{bmatrix}$$
$$= (1 + k_0 r^2 + k_1 r^4 + k_4 r^6) \begin{bmatrix} x_s \\ y_s \end{bmatrix} + \begin{bmatrix} 2k_2 x_s y_s + k_3(r^2 + 2x_s^2) \\ k_2(r^2 + 2y_s^2) + 2k_3 x_s y_s \end{bmatrix},$$

and $$r^2 = x_s^2 + y_s^2, X_s = [x_s, y_s]^T, k = [k_0, k_1, k_2, k_3, k_4,];$$

wherein the processor performs the undistorting operation for the second image based on the first internal parameter and the first distortion parameter to eliminate the distortion caused by the image capturing apparatus in the second image to thereby obtain the third image.

7. The image correction system according to claim 6, wherein the processor performs the undistorting operation based on the first distortion parameter to obtain a first undistorted image, and calculates the first homography matrix according to the first undistorted image and a coordinate matrix corresponding to the physical calibration panel.

8. The image correction system according to claim 6, wherein the processor performs the undistorting operation based on the second distortion parameter to obtain a second undistorted image, and calculates the second homography matrix according to the second undistorted image and a coordinate matrix corresponding to the calibration panel pattern.

9. The image correction system according to claim 6, wherein the processor performs an inverse homography transformation operation for the original image by using the second homography matrix to obtain a first corrected image, performs the undistorting operation for the first corrected image by using the second internal parameter and the second distortion parameter to obtain a second corrected image, performs a homography transformation operation for the second corrected image by using the second homography matrix to obtain a third corrected image, and performs the homography transformation operation for the third corrected image by using the first homography matrix to obtain a fourth corrected image, which is the compensated image.

10. The image correction system according to claim 6, wherein the image capturing apparatus and the projector are located on the same side of the projection screen, or the image capturing apparatus and the projector are located on different sides of the projection screen.

* * * * *